June 27, 1950      B. A. KNAUTH ET AL      2,512,946
MOTOR CONTROL SYSTEM EMPLOYING THYRATRON TUBES
Filed March 1, 1948
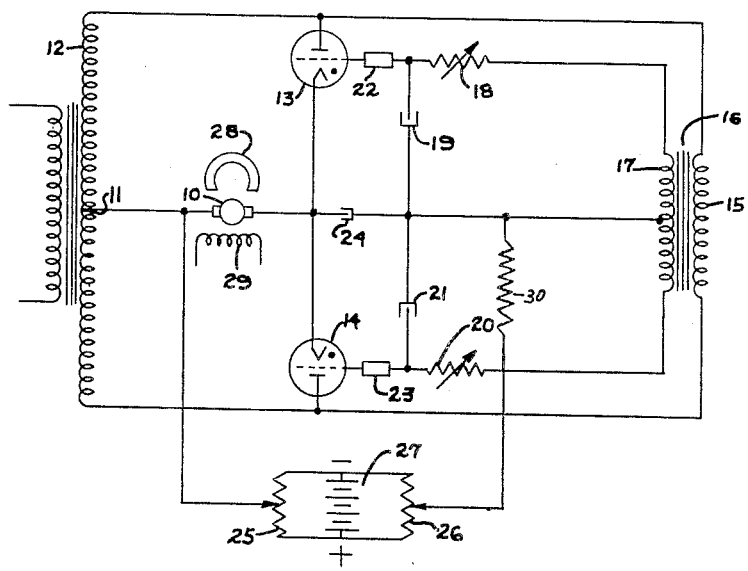
Inventors
BERTHOLD A. KNAUTH
AND PAO H. CHIN
By
Semmes, Keegin, Robinson & Semmes
ATTORNEYS Patented June 27, 1950

2,512,946

UNITED STATES PATENT OFFICE 2,512,946

MOTOR CONTROL SYSTEM EMPLOYING THYRATRON TUBES

Berthold A. Knauth, Bolton, N. Y., and Pao H. Chin, Cranford, N. J., assignors, by direct and mesne assignments, to The Motorspeed Corporation, New York, N. Y.

Application March 1, 1948, Serial No. 12,323

3 Claims. (Cl. 318—317)

Our invention relates to controlling the firing angle of thyratron tubes in which it has many applications, such as arc-welding, resistance welding, servo mechanisms, the control of the rate of rotation of electric motors, and other applications which will be apparent from the ensuing description.

While the drawing illustrates the system as applied to the control of the rate of rotation of a direct current motor, it will be apparent that the system has many other applications in industry where similar electrical conditions are desired in operating circuits.

An object of this invention is to provide a thyratron control system for a direct current motor that allows the operator to set the system so that the motor must be turning backward before the thyratron is fired.

Another object of this invention is to provide a diametric (full-wave) thyratron system with grid circuit networks that will allow both thyratrons to fire and conduct substantially equally.

A further object of this invention is to provide a diametric (full-wave) thyratron system with a grid transformer and resistor-capacitor network that will allow both thyratrons to fire and conduct substantially equally.

Still another object of this invention is to provide a thyratron for controlling the energization of a direct current motor, the armature of which is so connected to a thyratron circuit that the voltage generated by the armature when turning in the reverse direction manifests itself in the grid circuit of the thyratron as a positive-towards-the-grid voltage.

Further objects of this invention will be apparent to those skilled in the art to which it relates from the following specification, claims and drawing.

In controlling the firing of thyratron tubes which are grid controlled gaseous discharge devices that permit the passage of current in only one direction, there are several factors which, in general, effect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltage or voltages applied to the grid; (2) The simultaneously occurring anode-to-cathode potential of the tube which is the net instantaneous algebraic sum of all the voltages applied to the anode, which in this instance includes both the alternating supply voltage and the counter E. M. F. of the motor armature. It is believed unnecessary to fully explain the operation of the combination of factors above mentioned.

The present system is provided with a transformer and phase shifting network connected to the grid of the thyratron tube and energized from the source of alternating current with which the system is supplied, for the purpose of supplying a component of the thyratron grid bias potential.

The phase shifting of the alternating potential applied to the grid has been accomplished in a novel manner which gives more complete and accurate control of the operating characteristics of the system than has heretofore been possible.

The feature of this system wherein the D. C. component of the thyratron grid bias can be made negative with respect to the cathode makes it possible to reduce the motor to zero speed, and, beyond zero, to alter braking torque in the reversed direction of speed. For instance, where the motor is being used in a hoist mechanism, the motor may be allowed to turn in reverse under an outside force and the speed of this reverse motion may be controlled by the firing of the thyratron. In this instance, the system operates as a brake and governor when the motor is turned in reverse by, for instance, the weight of the load on the cable of the hoist mechanism. In reverse, the motor, in paying out under a load which causes it to rotate in reverse, creates an E. M. F. which tends to make the net D. C. component of grid voltage of the thyratron tube positive. This tends to fire the tube for a forward motion of the motor, so to control the firing of the tube for this reversed motion, there is imposed an additional negative potential in the thyratron grid circuits which can be made of a desired value to control automatically the speed of the motor turning reverse, thus acting as an automatic governor or speed limiter. The magnitude of the current supplied to the motor armature by the thyratron tubes is then a function of the reverse speed of rotation which is caused by the outside turning force (i. e., gravity acting on the load in the present instance) and the electromagnetic torque necessary to limit the speed to this pre-set value.

In the drawings, the sole figure is a schematic wiring diagram of an embodiment of this invention.

Referring to the drawing in detail there is illustrated a schematic wiring diagram of an electronic motor control circuit in which the armature 10 of the motor is supplied with direct current pulses during both the positive and negative portions of the alternating current cycle of the power supply. This is accomplished by connecting one side of the armature 10 of the direct current motor to the center tap 11 of the transformer secondary 12. The other side of the motor armature 10 is connected to the cathodes of the thyratrons 13 and 14, these cathodes being connected together. The anodes of the thyratrons 13 and 14 are connected to the opposite ends of the transformer secondary 12 so that these thyratrons 13 and 14 function as a diametric (full-wave) rectifier in so far as they are connected to rectify both halves of the alternating current cycle.

The primary 15 of the transformer 16 is energized from the secondary 12 and for this purpose the ends of the primary 15 are connected to the respective ends of the secondary 12. The secondary 17 of the transformer 16 is inductively coupled to the primary 15 and the ends of this secondary are connected to the ends of a pair of phase shifting circuits including the resistors 18 and 20 and the capacitors 19 and 21. One terminal of the resistor 18 is connected to an end of the secondary 17 and the other terminal is connected to one end of the capacitor 19 and to one end of the grid current limiting resistor 22. The other end of this resistor 22 is connected to the grid of the thyratron 13. Likewise the resistor 20 is connected between the lower end of the secondary 17 and the capacitor 21 and the grid current limiting resistor 23, the other end of the resistor 23 being connected to the grid of the thyratron 14. The center tap of the secondary 17 is connected to the junction between the capacitors 19 and 21 and this junction is coupled to the cathodes of the thyratrons 13 and 14 by the capacitor 24.

The center tap 11 of the secondary 12 and one side of the motor armature are connected to the center tap of the secondary 17 through the potentiometers 25 and 26. The windings of the potentiometers 25 and 26 are connected in parallel across a source of direct current supply 27. The variable contactor of the potentiometer 25 is connected to the center tap of the transformer secondary 12 and the variable contactor of the potentiometer 26 is connected to the center tap of the secondary 17.

In order to provide a satisfactory filter combination for filtering the armature voltage before it is introduced into the grid circuit there is located a resistor 30 in the lead to the potentiometer 26; thus giving a filtering combination comprising the resistor 30 and the capacitor 24.

The direct current motor including the armature 10, may be provided with either a permanent magnet field 28 or with a winding 29, or it may be provided with both a permanent magnet field or a wound field. If a wound field 29 is employed it must, of course, be energized from a suitable source of direct current supply.

In operation the armature 10 of the direct current motor is energized by pulses fed to it alternately through the thyratrons 13 and 14. When the anode of the thyratron 13 is positive this thyratron may be fired and caused to supply direct current to the armature 10 from the portion of the secondary winding between the tap 11 and the end connected to the anode of the thyratron 13. Likewise, when the anode of the thyratron 14 is positive with respect to the cathode, this thyratron may be fired and caused to pass current to the armature 10 from the portion of the secondary 12 between the tap 11 and the end connected to the anode of the thyratron 14.

The firing of the thyratrons 13 and 14 is controlled by suitable circuits connected to the grid electrodes of these tubes. These circuits include the potentiometers 25 and 26 and the phase shifting circuits connected to the secondary 17. The use of two potentiometers 25 and 26 across the source of direct current voltage 27 allows the grids of the thyratrons 13 and 14 to be made actually negative with respect to the cathodes of these thyratrons and allows the operator to set the motor for less than zero speed, that is, the circuit may be adjusted so that the motor armature 10 must be turning backward before the thyratrons 13 and 14 will be caused to fire.

The secondary 17 of the transformer 16 supplies the phase shifting circuits including the resistors 18 and 20 and capacitors 19 and 21 so that the circuit including the resistor 18 and capacitor 19 shifts the phase of the voltage applied across it from half of the secondary 17 and this phase shifted voltage is applied to the grid of the thyratron 13. The other half of the secondary 17 is connected across the phase shifting circuit including the resistor 20 and the capacitor 21 and phase shifted voltage from this circuit is applied to the grid of the thyratron 14.

No voltage is applied to the grids of the thyratrons 13 and 14 from the direct current supply 27 when the variable contactors of the potentiometers 25 and 26 are positioned in the electrical centers of the windings of these potentiometers and at that time the center of the secondary 17 functions as though virtually connected to point 11. However, when the variable contactors of one or both of the potentiometers 25 and 26 are displaced from the electrical center of the corresponding potentiometer winding voltage from the source 27 is applied to the grids of the thyratrons 13 and 14.

The resistor 30 gives with capacitor 24 a filter combination which is operative even when the potentiometers are at the ends of their travel. In the case of the thyratron 13 this voltage is applied from the cathode through the armature 10 then, in series relation through the source 27 via the variable contactors of the potentiometers 25 and 26, and resistor 30, thence through capacitance 19 and through the resistors 22 to the grid. Similarly, for thyratron 14 except via capacitance 21 and grid resistance 23.

It will be observed that the grids of the thyratrons 13 and 14 may be made positive with respect to the cathodes either by moving the contactor of the potentiometer 26 towards the positive end of the winding of this potentiometer or by moving the variable contactor of the potentiometer 25 toward the negative end of the winding of this potentiometer. On the other hand the grids of the thyratrons 13 and 14 may be made negative with respect to the cathodes either by moving the variable contactor of the potentiometer 26 toward the negative end of the winding of this potentiometer or by moving the variable contactor of the potentiometer 25 toward the positive end of the winding of this potentiometer. It is, of course, obvious that the full effect of the voltage of the source 27 may be obtained by moving both of the potentiometer contactors, that is, the contactor of the potentiometer 26 may be moved up toward the negative end of the potentiometer winding and at the same time the contactor of the potentiometer 25 may be moved down toward the positive end of this winding or vice versa.

The operator may start the motor armature 10 running forward slowly by moving the variable contactor of the potentiometer 26 somewhat toward the positive end of the potentiometer (assume the contactor of potentiometer 25 to be in the center of this potentiometer winding) winding so that the thyratrons 13 and 14 fire sufficiently to energize the motor to start it running. If now the load on the armature shaft is increased somewhat so as to tend to slow the motor down, the firing angle of the thyratron tubes 13 and 14 will be automatically advanced so that the speed of the motor armature is maintained practically constant by virtue of the increased current supplied to the armature through the thyratrons 13 and 14. This automatic advancing of the firing angle of the thyratrons results from the utilization in this circuit of the change in wave form of the armature terminal voltage after conduction as brought about by the load on the armature motor shaft. The motion of the armature may be increased by increasing the positive bias supplied to grids of the thyratrons 13 and 14 from the source 27. On the other hand the motor armature 10 may be employed for the purpose of lowering a load when this motor is employed in a hoist or similar mechanism. Under such circumstances the load tends to turn the motor armature 10 backward, thus causing the motor to generate a potential which appears on the grid side of the capacitor 24 as a positive voltage. When this positive voltage is of sufficient magnitude relative to the assumed oppositely poled voltage from source 27 the thyratrons 13 and 14 are fired and pass current to the motor armature that tends to retard the turning of the armature in the reverse direction. The amount of this braking may be made more than proportional to the rate of rotation of the armature by adjusting the variable contactors of the potentiometers 25 or 26 that a constant rate of rotation may be obtained or the rotation stopped.

While we have shown our system as applied to a hoist mechanism it will be obvious that the system is useful in many other connections, and that the immediate application has been illustrated and described merely to illustrate the invention. We desire that our invention be limited only by the scope of the appended claims and the showing of the prior art.

We claim:

1. A thyratron control system for controlling a direct current motor comprising a thyratron having an anode, a grid, and a cathode, a direct current motor having its armature connected in series with the thyratron across an alternating current supply, a phase shifting circuit connected between the grid of the thyratron and the alternating current supply, a source of direct current supply, a pair of potentiometers connected in parallel across the direct current supply, means connecting the negative terminal of the armature with the sliding contact of one potentiometer, and means connecting the sliding contact of the other potentiometer with the grid circuit whereby the thyratron may be controlled to fire only when the motor is turning in reverse.

2. A thyratron control system for controlling a direct current motor comprising a thyratron having an anode, a grid, and a cathode, a direct current motor having its armature connected in series with the thyratron across an alternating current supply, a phase shifting circuit connected between the grid of the thyratron and the alternating current supply, said phase shifting circuit including a variable resistor and capacitor in series connected across the alternating current supply, a source of direct current supply, a pair of potentiometers connected in parallel across the direct current supply, means connecting the negative terminal of the armature with the sliding contact of one potentiometer and means connecting the sliding contact of the other potentiometer with the grid circuit whereby the thyratron may be controlled to fire only when the motor is turning in reverse.

3. A thyratron control system for controlling a direct current motor comprising a thyratron having an anode, a grid, and a cathode, a direct current motor connected to the cathode and in series with the thyratron across an alternating current supply, a phase shifting circuit including a resistor and a capacitor connected in series with a transformer connected across the alternating current supply, means connecting the phase shifting circuit with the grid of the thyratron, a direct current supply, a pair of potentiometers connected in parallel with the direct current supply, a conductor connecting the sliding contact of one potentiometer with the negative terminal of the motor armature, and means connecting the sliding contact of the other potentiometer to the phase shifting circuit.

BERTHOLD A. KNAUTH.
PAO H. CHIN.

REFERENCES CITED

The following references are of record in the file of this patent:

UNITED STATES PATENTS

| Number | Name | Date |
| --- | --- | --- |
| 2,082,496 | Howe | June 1, 1937 |
| 2,236,086 | Conover | Mar. 25, 1941 |
| 2,399,695 | Satterlee | May 7, 1946 |